(12) United States Patent
Dietrich

(10) Patent No.: US 8,539,744 B2
(45) Date of Patent: Sep. 24, 2013

(54) CROP LIFTER AND CROP ACCESSORY ATTACHMENT

(76) Inventor: Dave Dietrich, Assiniboia (CA)

( * ) Notice: Subject to any disclaimer, the term of this patent is extended or adjusted under 35 U.S.C. 154(b) by 17 days.

(21) Appl. No.: 13/137,989

(22) Filed: Sep. 22, 2011

(65) Prior Publication Data
US 2012/0060462 A1 Mar. 15, 2012

Related U.S. Application Data

(60) Continuation-in-part of application No. 12/081,440, filed on Apr. 16, 2008, now abandoned, which is a division of application No. 10/558,199, filed as application No. PCT/CA2005/000012 on Jan. 6, 2005, now Pat. No. 7,650,738.

(51) Int. Cl.
*A01D 34/00* (2006.01)
(52) U.S. Cl.
USPC .............................................. 56/312
(58) Field of Classification Search
USPC ........... 56/307, 312, 314, 17.3, 17.4; 292/32, 292/341.11, 341.13; 267/53; 403/87, 91, 403/103, 104
See application file for complete search history.

(56) References Cited

U.S. PATENT DOCUMENTS

| | | | |
|---|---|---|---|
| 658,133 A * | 9/1900 | Ullmann | 56/312 |
| 723,880 A * | 3/1903 | Koch | 56/312 |
| 727,576 A | 5/1903 | Blocki | |
| 791,022 A | 5/1905 | Gaterman | |
| 843,164 A | 2/1907 | McCutchan | |
| 868,739 A * | 10/1907 | Webber | 56/313 |
| 1,123,632 A | 1/1915 | Weisgarber | |
| 1,202,084 A | 10/1916 | Merkel | |
| 1,204,441 A | 11/1916 | Holland-Letz | |
| 1,834,008 A | 12/1931 | Swanson | |
| 1,942,286 A | 1/1934 | John | |
| 1,979,010 A | 10/1934 | Paradise | |
| 2,205,497 A | 12/1935 | Crumb et al. | |
| 2,099,471 A | 11/1937 | Edgington | |
| 2,141,299 A | 12/1938 | Hume et al. | |
| 2,141,300 A | 12/1938 | Hume et al. | |

(Continued)

FOREIGN PATENT DOCUMENTS

| | | |
|---|---|---|
| CA | 407654 | 9/1942 |
| CA | 548220 | 11/1957 |
| CA | 719825 | 10/1965 |

OTHER PUBLICATIONS

U.S. Appl. No. 12/081,440, filed Apr. 16, 2008; Dietrich.

*Primary Examiner* — Thomas B Will
*Assistant Examiner* — Joan D Misa
(74) *Attorney, Agent, or Firm* — Nixon & Vanderhye P.C.

(57) ABSTRACT

A crop lifter for attachment to a cutting header includes a lifter member adapted for attachment to the header and a lifting finger attached to the lifter member by a quick-attach mechanism such that a leading end of the lifting finger is ahead of and below the knife. The lifting finger is structurally weak compared to the lifting member such that the lifting finger will readily move when striking an obstruction, thereby preventing damage to the lifter member or header. The crop lifter or similar crop accessory can have a latch member at a rear end thereof, and a cooperating latch member attached to the header. The accessory latches to the header and a releasable latch lock prevents forward movement of the accessory that would disengage the latch.

10 Claims, 5 Drawing Sheets

(56) References Cited

U.S. PATENT DOCUMENTS

| | | | |
|---|---|---|---|
| 2,287,304 | A | 6/1942 | Hall |
| 2,290,404 | A * | 7/1942 | Kent ............................. 56/312 |
| 2,294,646 | A | 9/1942 | Henry |
| 2,484,704 | A | 10/1949 | Girodat |
| 2,892,298 | A | 8/1957 | Chaney |
| 3,579,967 | A | 5/1971 | Schumacher |
| 3,616,631 | A | 11/1971 | Quam |
| 3,633,350 | A | 1/1972 | Schumacher |
| 3,834,139 | A | 9/1974 | Schumacher et al. |
| 4,120,138 | A | 10/1978 | Schumacher |
| 4,295,328 | A | 10/1981 | Schumacher |
| 4,361,196 | A | 11/1982 | Hoyle, Jr. |
| 4,477,253 | A | 10/1984 | Euvrard |
| 5,290,030 | A | 3/1994 | Medbury |
| 5,511,977 | A | 4/1996 | Futch, Jr. |
| 5,906,091 | A | 5/1999 | Gemar |
| 6,244,026 | B1 | 6/2001 | Minnihan et al. |
| 6,386,528 | B1 | 5/2002 | Thorn et al. |
| 6,442,919 | B1 | 9/2002 | Schumacher |
| 6,655,120 | B2 | 12/2003 | Schumacher et al. |
| 6,691,499 | B2 * | 2/2004 | Schumacher et al. .......... 56/312 |
| 6,708,477 | B2 | 3/2004 | Schumacher et al. |
| 7,306,410 | B2 | 12/2007 | Borschert et al. |
| 7,650,738 | B2 | 1/2010 | Dietrich |
| 2001/0037635 | A1 | 11/2001 | Figliuzzi |
| 2002/0093234 | A1 | 7/2002 | Thorn et al. |
| 2002/0166314 | A1 | 11/2002 | Schumacher et al. |
| 2003/0005678 | A1 | 1/2003 | Schumacher et al. |
| 2003/0050131 | A1 | 3/2003 | Grace |

\* cited by examiner

CROP LIFTER AND CROP ACCESSORY ATTACHMENT

This application is a Continuation-In-Part of application Ser. No. 12/081,440 now abandoned, filed Apr. 16, 2008, which is a Divisional of application Ser. No. 10/558,199, filed Aug. 11, 2006, (now U.S. Pat. No. 7,650,738), which is a 371 (national stage) of PCT/CA05/000012 filed Jan. 6, 2005, the entire contents of which are hereby incorporated herein by reference in this application.

This invention is in the field of cutting headers such as are used in agriculture for cutting crops for harvest and the like, and in particular with crop lifters and like accessories such as are mounted on such headers to increase crop gathering and retention in the harvesting machine.

BACKGROUND

For various reasons crops sometimes are lying so close to the ground that it is difficult to cut them with a conventional harvest header. Some crops are inherently short, while others may be taller, but are prone to fall down when they reach maturity. Heavy rain or hail can also cause crop to be lying close to the ground at harvest time.

Typically the knife on cutting headers comprises a knife bar extending along the front lower edge of the header, with a plurality of triangular knife sections attached to the bar such that the apex of the triangle extends forward from the bar. The exposed side edges of the knife sections are sharpened. Guards are attached to the front lower edge of the header and serve to protect the knife sections from breakage when contacting stones and like obstructions. The guards comprise pointed guard fingers extending forward, and the knife moves back and forth along the edge of the header in a slot cut laterally through the guard fingers. In addition to protecting the knife, the guard fingers also enable the knife sections to cut the crop. As the knife section moves back and forth it pushes crop against the sides of those portions of the guard finger that are above and below the slot, shearing the crop stalks.

A conventional knife is a few inches above the ground when the header is in its lowest position, such that very short or downed crop material will pass under the knife and be lost. Many different kinds of "crop lifters", as they have come to be known have been developed over the last century and more. Typically these crop lifters are attached to the header and/or the forward extending point of the guard finger, and provide an arm of various designs that rides along the ground ahead of the knife. A lifting finger extends at a shallow angle from the front of the arm back and over the knife. As the header moves down the field, the arm rides along the ground and under the downed crop stalks, which then are lifted and pass over the lifting finger to the knife, where they are cut and continue moving onto the header from where they can be passed to the harvester, swather table, or the like.

U.S. Pat. Nos. 700,029 and 791,022 to Gatermann, 2,734,332 to Fisher, 2,892,298 to Chaney, 2,960,814 to Babcock, and Canadian Patent Number 407,654 to Young disclose such a crop lifter that is pivotally attached to the header so as to be able to move up and down to follow the ground. The Babcock and Fisher devices float on the ground, while the others are biased toward the ground by springs. U.S. Pat. No. 4,120,138 to Schumacher illustrates a crop lifter that is fixed to the header instead of pivoting, but is made of spring steel so that same may move up and down to follow the ground.

The leading ends of the lifting fingers on these devices is fixed in relation to the arm such that the leading end is at a fixed distance above the ground, but quite close to the ground in order to lift as much crop as possible. Generally speaking crop stalks that pass under the leading end will be lost, and those that pass over will be harvested.

Most commonly in the prior art the leading end of the lifting finger is generally the leading end of the arm, and is therefore upturned to provide a ski effect and ride over the ground instead of digging in. In the Chaney and Fisher devices, the leading end is ahead of the arm and is pointing generally down very close to the ground to collect the lowest lying crop possible. In the Fisher device, an adjustment is provided to vary the angle of the lift finger, and the lift finger can also be longitudinally adjusted relative to the arm to vary the distance from the leading end of the lifting finger to the ground.

If even a small obstruction is contacted by the Chaney or Fisher devices, they will not ride over it, but will be required to push it to the side, making them more subject to damage. A problem with conventional lifters of substantially all types is that breakage, bending, and deformation is not uncommon as a result of contact with obstructions or ground variations in the field. Repair of such damage is time consuming, requiring removal of the bolts or like fasteners attaching the lifter, and repair if possible by straightening with a press, welding, or the like. Often replacement is necessary at fairly significant expense.

Demonstrating another alternative crop lifter, United States Patent Application Publication 2001/0037635 of Figliuzzi discloses a crop lifter that provides a lifting finger that extends rearward and upward from the point of a guard finger. In one illustrated embodiment the point of the guard finger is extended substantially forward from a conventional location.

Generally cutting headers are used in taller crops as well as on the short and downed crops described above. In such crops the header is raised a substantial distance above the ground. Often in such taller crops however there will be crop stalks that have fallen over due to insect damage, weather, or the like and are closer to the ground than the desired cutting height. It is problematic to operate conventional crop lifters below the cutting height to lift these downed stalks.

Crop lifters interfere somewhat with normal operations of the header when harvesting taller crops with the header raised a substantial distance above the ground. During turns in particular, because the crop lifters generally extend a considerable distance ahead of the header, some crop stalks are pushed over and not cut. It is common practice therefore to remove the crop lifters when using the header on taller crops. In view of this, and the further requirement as discussed above to remove the lifters for repair and replacement, there is also considerable prior art directed to providing a crop lifter that is easily installed and removed.

U.S. Pat. No. 3,579,967 to Schumacher discloses a quick attachment mechanism for a crop lifter. A rear end of a springy arm of the crop lifter defines a notch that fits into an annular groove in a nut that attaches the guard to the header. The extreme rear end of the notched portion is bent down, such that the notch can only be inserted into the groove when the front end of the arm is tilted downward. After insertion, the front end of the arm is raised, and a hook is placed over the guard finger to lock the arm in tension and in the raised position. With the arm so raised, the bent portion at the rear of the arm prevents the arm from moving forward and disengaging the grooved nut.

U.S. Pat. Nos. 4,295,328 and 6,442,919 and U.S. Patent Application Publication 2003/0005678 of Schumacher disclose quick attachment mechanisms for crop lifters that use the bent rear notch and provide alternate mechanisms using springs, clips and the like to hold the arm in the raised position by releasably securing the arm to the guard finger.

Canadian Patent Numbers 548,220 to A. Claas and 719,825 to R. Claas disclose a quick attachment mechanism for a crop lifter that attaches only to the guard finger with a spring biased clamp.

SUMMARY OF THE INVENTION

It is an object of the present invention to provide a crop lifter that overcomes problems in the prior art. It is also an object of the present invention to provide a crop accessory attachment mechanism that overcomes problems in the prior art.

The crop lifter includes a structurally weak portion adapted to move by bending or breaking when striking an obstruction, thereby preventing damage to the crop lifter. The structurally weak portion can be quickly replaced.

The present invention provides a crop lifter, sunflower pan, or like crop accessory that attaches quickly to the header. A mid-portion of the apparatus engages a guard finger and a rear end of the apparatus is attached to the header with a latch. A latch member on the rear end of an arm or accessory engages a cooperating latch member attached to the header, and the rear end of the arm or accessory comprises a lock mechanism to hold the arm or accessory in place.

The present invention provides, in a first embodiment, a crop lifter adapted for attachment to a cutting header having a knife and cooperating guards mounted along a lower front edge thereof. The crop lifter comprises a lifter member adapted for attachment to the header and a lifting finger attached to the lifter member by a quick-attach mechanism such that a leading end of the lifting finger is ahead of and below the knife. A carrying portion extends rearward from the leading end of the lifting finger to guide lifted crop to the knife for cutting. The lifting finger is structurally weak compared to the lifting member such that the lifting finger will readily move when striking an obstruction, thereby preventing damage to the lifter member.

The present invention provides, in a second embodiment, a crop accessory adapted for attachment to a cutting header having a knife mounted along a lower front edge thereof and guards attached to the lower front edge with guard bolts. The crop accessory comprises a header latch member adapted for attachment to a guard bolt on the header. An accessory latch member at a rear end of the accessory is adapted to move rearward into engagement with the header latch member such that the rear end of the accessory is maintained in substantially fixed vertical and lateral relationship to the header. A guard finger aperture is defined on the accessory forward of the accessory latch member and oriented such that a forward extending guard finger of a guard enters the guard finger aperture when the accessory latch member is moved rearward into engagement with the header latch member, and a releasable latch lock is operative to prevent forward movement of the accessory latch member with respect to the header latch member.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
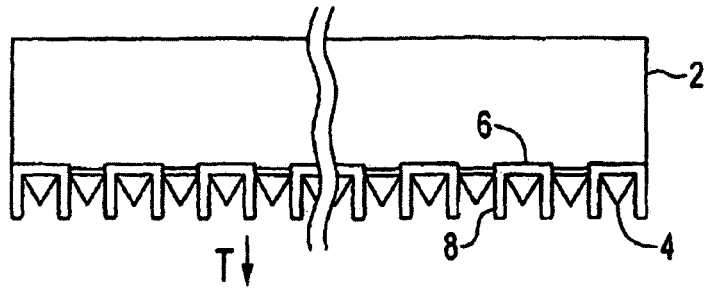
FIG. 1 is a schematic top view of a cutting header of the prior art.

FIG. 1 illustrates a cutting header 2 of the prior art having a knife 4 and cooperating guards 6 mounted along a lower front edge thereof. The guards 6 have guard fingers 8 extending forward from the knife 4. The header is designed to travel along a field in an operating travel direction T.

Figure 2:
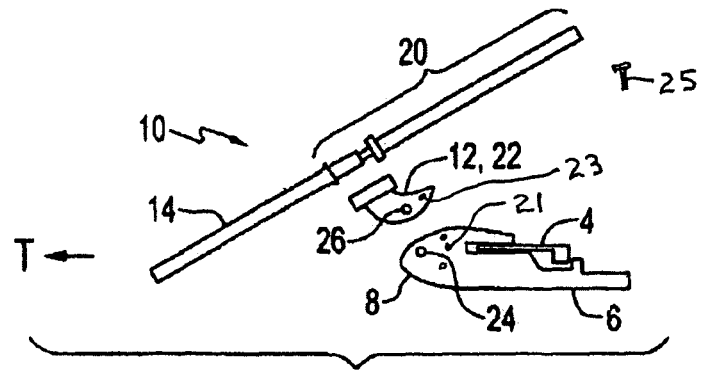
FIG. 2 is an exploded side view of a crop lifter of the invention.
Figure 3:
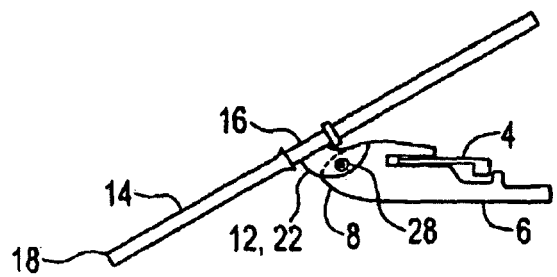
FIG. 3 is a side view of the assembled crop lifter of FIG. 2.

A crop lifter 10 of the invention for attachment to the header 2 is illustrated in FIGS. 2 and 3. The crop lifter 10 comprises a lifter member 12 adapted for attachment to the header 2 and a lifting finger 14 attached to the lifter member 12 by a twist and lock quick-attach mechanism 16 such that a leading end 18 of the lifting finger 14 is ahead of and below the knife 4. A rear carrying portion 20 of the crop lifter 10 extends rearward from the lifting front portion immediately behind the leading end 18 of the lifting finger 14 to carry lifted crop to the knife 4 for cutting.

In the illustrated embodiment of FIGS. 2 and 3 the carrying portion 20 is provided by a rear portion of the lifting finger 14. In operation the leading end 18 of the lifting finger 14 will pass under low lying crop stalks and the stalks will then be lifted by the front portion of the lifting finger 14 and carried by the rear carrying portion 20 of the lifting finger 14 to the knife 4.

Figure 4:
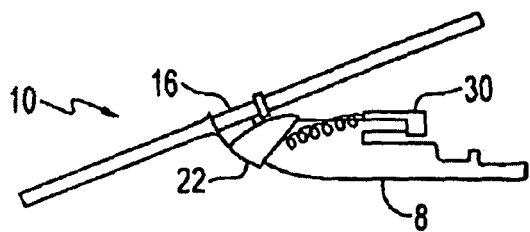
FIG. 4 is a side view of an alternate embodiment of the crop lifter.

In the embodiments illustrated in FIGS. 2-4, the lifter member 12 consists solely of a bore member or mounting bracket 22 attached to one of the guard fingers 8. In the embodiment of FIGS. 2 and 3, the guard finger 8 defines a finger hole 24 extending therethrough, and the mounting bracket 22 defines a bracket hole 26. The mounting bracket 22 is attached to the guard finger 8 by a bolt 28 extending laterally through the bracket hole 26 and finger hole 24 as illustrated in FIG. 3. The mounting bracket 22 can be pivoted up and down to vary a distance between the leading end 18 of the lifting finger 14 and ground level, and a pivot lock mechanism is operative to fix the mounting bracket 22, and thus the lifting finger 14, at desired pivotal location with respect to the guard finger 8. The pivot lock mechanism can be provided by a stop pin 25 placed through a hole 21 in the mounting bracket 22 and a selected one of a plurality of stop holes 23 in the guard finger 8 to prevent movement of the mounting bracket 22 up or down and thus prevent movement of the leading end 18 of the lifting finger 14. Similarly the pivot lock mechanism can be provided simply by bolt 28, which could be loosened to pivot the mounting bracket 22 up or down to achieve a desired orientation and then tightened to clamp the mounting bracket to the guard finger 8 and fix the lifting finger 14 at the desired orientation. Adjustment of the relative elevations of the leading end 18 of the lifting finger 20 and the guard finger 8 can thus be made to suit different crop conditions.

Guards 6 having guard fingers 8 that define finger holes 24 can be manufactured as original equipment or after-market options. Such guards 6 would be attractive in that they would not interfere with the conventional operation of the machine, but would allow for easy installation of the crop lifter 10 of the invention.

In the alternate embodiment of FIG. 4, the mounting bracket 22 is attached to the guard finger 8 by a spring biased clamp 30, such as is known in the prior art of Claasen. Thus in the embodiments of FIGS. 2-4, the crop lifter 10 is very simple and economical, and readily mounted to the header 2.

The lifting finger 14 is made from a resilient plastic, nylon, or similar material so that it is structurally weak compared to the lifting member 12 such that the lifting finger 14 will readily move, by breaking or bending when striking an obstruction, thereby preventing damage to the lifter member 12. The lifting fingers 14 can also be somewhat flexible so they are less likely to dig stones or the like out of the ground, but will flex around such obstructions. Such raised stones can cause damage to the machine.

The lifting fingers 14 are relatively inexpensive, and the twist and lock quick-attach mechanism 16 allows for very quick removal of broken lifting fingers 14 and replacement with new ones. Thus, compared to prior art crop lifters, maintenance time and expense is greatly reduced. The lifting fingers 14 can also be made to flex and bend readily to resist breakage, although sometimes they may become badly bent and require replacement prior to breaking.

The lifting fingers 14 can also be easily cut with snips or the like to the desired length so that the leading end 18 thereof is located at the desired picking height relative to the ground. The lifting fingers 14 can be cut to a length such that they actually touch or rake the soil surface if desired, allowing the lifter 10 to lift crop stalks that are laying flat on the ground.

The lifting finger 14 can have a larger diameter at a front portion thereof to resist breakage, and also the front portion can be very long if desired so that the lifting fingers will reach substantially below the header. The lifting fingers will then lift fallen or leaning stalks in a higher crop where the header is operated at a considerable height above the ground to minimize the amount of material entering the harvesting machine, but where there are some stalks that have fallen and would conventionally be missed.

Figure 5:
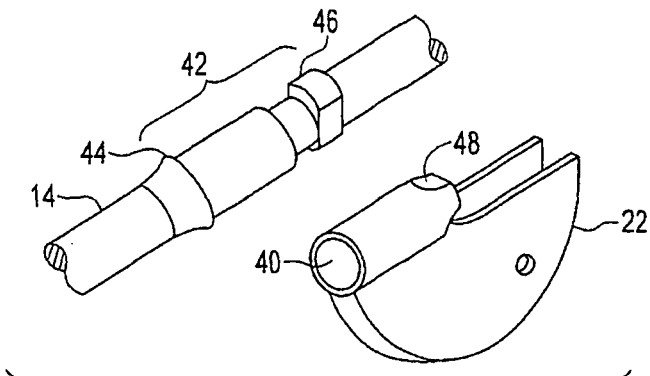
FIG. 5 is a perspective view of the locking portion of the lifting finger.
Figure 6:
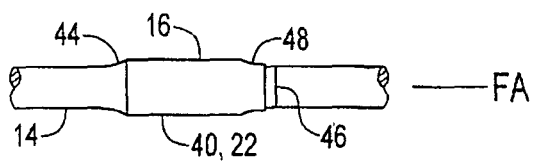
FIG. 6 is a side view of the twist and lock mechanism showing the lifting finger in a first orientation for insertion into the bore of the mounting bracket.
Figure 7:
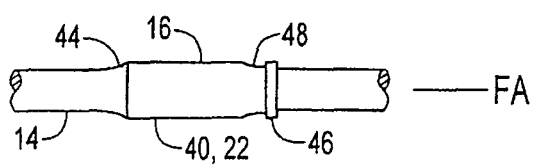
FIG. 7 is a side view of the twist and lock mechanism of FIG. 6 showing the lifting finger in a second orientation for locking same into the bore of the mounting bracket.

Details of one embodiment of a twist and lock quick-attach mechanism 16 are illustrated in FIGS. 5-7. The illustrated twist and lock quick-attach mechanism 16 comprises a bore 40 defined by the mounting bracket 22 and oriented substantially aligned with the operating travel direction T and sloping upward from a front end thereof to a rear end thereof as illustrated in FIG. 2. The bore 40 and a cooperating locking portion 42 of the lifting finger 14 are configured such that the locking portion 42 of the lifting finger 14 can slide longitudinally in the bore 40 when oriented in a first orientation to be inserted into the bore 40, as seen in FIG. 6, and are configured such that the locking portion 42 locks in the bore 40 when twisted a quarter turn about a finger axis FA to a second orientation shown in FIG. 7.

The locking portion 42 of the lifting finger 14 comprises front and rear lobes 44, 46 extending radially from the surface of the lifting finger 14. The bore has a flattened rear portion 48 and configured such that the lifting finger 14 can be inserted into the bore 40 in the first orientation and the rear lobe will pass through the flattened portion 48 at the rear end of the bore 40. When fully inserted the front lobe 44 bears against a front end of the bore 40 and the lifting finger 14 can be twisted a quarter turn about the finger axis FA to the second orientation with the rear lobe 46 bearing against the flattened portion 48 at the rear end of the bore 40.

Thus the lifting finger 14 is readily installed and removed by twisting same one quarter turn about the finger axis FA.

Figure 8:
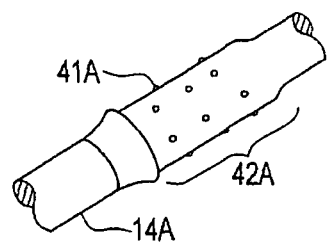
FIG. 8 is a side view of an alternate embodiment of a locking portion of a lifting finger.

FIG. 8 illustrates an alternate embodiment where the cooperating locking portion 42A of the lifting finger 14A are configured such that the locking portion 42A of the lifting finger 14A can slide longitudinally in a bore. The bore and locking portion 42A are configured such that the locking portion 42A of the lifting finger 14A can slide longitudinally into the bore and such that movement of the locking portion 42A out of the bore is resisted by friction forces between walls of the bore and the locking portion 42A of the lifting finger 14A In the illustrated embodiment of FIG. 8 the outer surface of the locking portion 42A comprises protrusions 41A extending outward therefrom to increase friction between the locking portion 42A and walls of the bore. Conveniently the bore and locking portion 42A will be cylindrical to allow insertion and removal with a twisting action.

Figure 9:
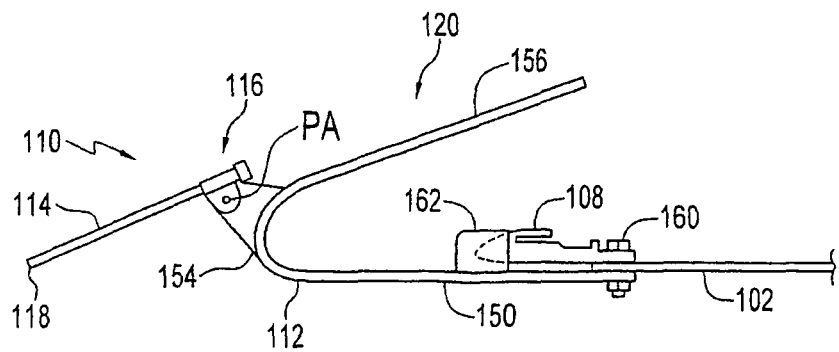
FIG. 9 is a side view of an alternate embodiment of the crop lifter.

FIG. 9 illustrates an alternate embodiment of the crop lifter 110 wherein the lifter member 112 comprises an arm 150, and in the illustrated embodiment the arm 150 is further adapted to ride along the ground. The arm 150 is attached at a rear end thereof to the header 2 by conventional guard bolts 160 and includes an aperture member 162 at a middle portion thereof that defines a guard finger aperture oriented to engage the point of a guard finger 108 when the rear end of the arm 150 is attached to the guard bolt 160. The arm 150 has an upwardly curved forward end 154. The quick-attach mechanism 116 is pivotally attached about a pivot axis PA to an upper portion of the forward end 154 of the arm 150 such that the lifting finger 114 can be pivoted up and down to vary a distance between the leading end 118 of the lifting finger 114 and ground level.

In the illustrated embodiment of FIG. 9 the lifting finger 114 extends only forward of the quick-attach mechanism 116. The carrying portion 120 of the crop lifter 110 to guide lifted crop to the knife for cutting is provided by the upward and rearward extending portion 156 of the arm 150. Alternately, another finger member extending in the required direction could be attached to the arm 150 by another quick-attach mechanism, or a through finger such as illustrated in FIGS. 2 and 3 could be used.

Figure 10:
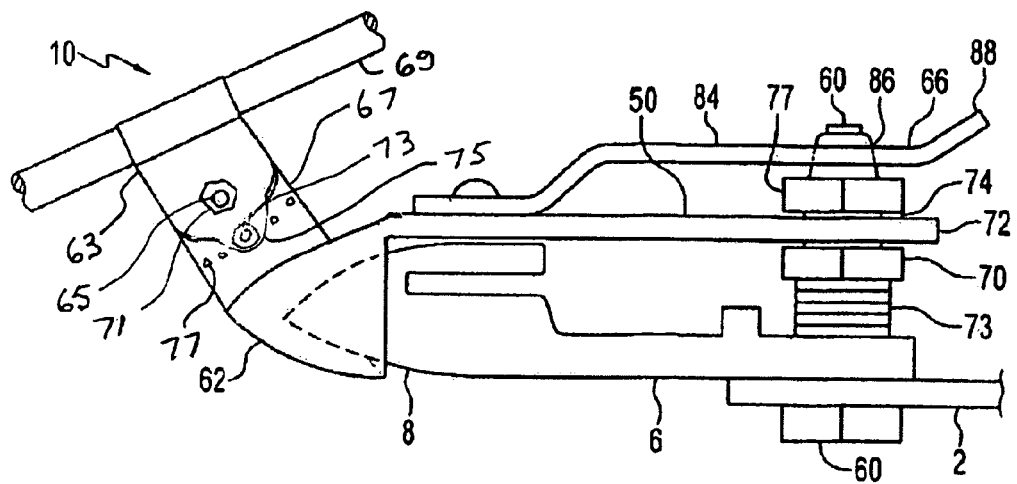
FIG. 10 is a side view of a crop lifter attached to a header with a releasable latch mechanism.

FIG. 10 illustrates a crop lifter 10 that can be quickly installed on a header 2 by sliding the lifter arm 50 rearward such that a guard finger 8 of a guard 6 attached to the header 2 engages a guard finger aperture in an aperture member 62 on the lifter 10 and the rear end of the lifter arm 50 moves into latching engagement with the header 2. The rear end of the lifter 10 is then locked to the header 2 to prevent forward movement of the lifter 10. Releasing the latch lock 66 at the rear end of the lifter arm 50 allows the lifter 10 to be moved forward and removed from the header 2.

In the crop lifter of FIG. 10, a mounting bracket 63 is pivotally attached to the aperture member 62 by a bolt 65 extending laterally through a hole in a lug 67 extending up from the front end of the aperture member 62, and a lifting finger 69 is secured in the mounting bracket 63. As in FIG. 3 above, the mounting bracket 63 can be pivoted up and down to vary a distance between the leading end of the lifting finger 63 and ground level, and then locked at the desired orientation. The nut 71 on the bolt 65 could be loosened to pivot the mounting bracket 63 up or down to achieve a desired orientation and then tightened to clamp the mounting bracket 63 to the lug 67 and fix the lifting finger 69 at the desired orientation. Alternately, or in addition, a stop pin 73 can be positioned through a projecting tab 75 of the mounting bracket 63 and through a selected one of a plurality of stop holes 77 in the lug 67 to block movement up or down of the mounting bracket 63, and thereby lock the mounting bracket 63 with respect to the aperture member 62, and thus the guard finger 8, and fix the lifting finger 69 at a selected one of a plurality of angular orientations.

A header latch member 70 is adapted for attachment to a guard bolt 60 on the header 2. An arm latch member 72 is located at a rear end of the arm 50 and is adapted to move rearward into engagement with the header latch member 70 such that the rear end of the arm 50 is maintained in substantially fixed vertical and lateral relationship to the header 2.

Figure 11:
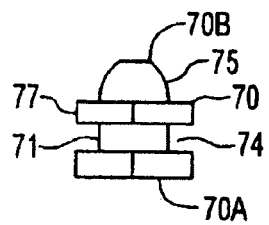
FIG. 11 is a side view of a header latch member of the latching mechanism of FIG. 10.
Figure 12:
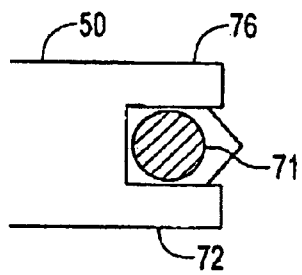
FIG. 12 is a schematic section view showing the legs of the arm latch member engaged in a groove on each side of the shaft of the header latch member.

In the illustrated embodiment of FIG. 10, as shown in FIG. 11, the header latch member 70 defines an annular groove 74 such that there is a groove on each side thereof, and the arm latch member 72 at the rear end of the arm 50 comprises two legs 76, as shown in FIG. 12, configured to engage the annular groove 74 on each side thereof with the shaft 71 of the header latch member 70 between the legs 76. Providing an annular groove 74 allows the header latch member 70 to be oriented in any direction and still have grooves on each side thereof to engage the legs 76. Thus with the legs 76 engaged in the annular groove 74, the rear end of the arm 50 is vertically and laterally fixed with respect to the header 2.

As the arm 50 is moved rearward to engage the arm latch member 72 with the header latch member 70 the guard finger 8 enters the guard finger aperture defined by the aperture member 62 on the arm 50 forward of the arm latch member 72. Thus when the latch members 70, 72 are fully engaged, the guard finger 8 is fully engaged in the aperture member 62 and the lifter 10 is thus secured to the header 2. The releasable latch lock 66 is operative to prevent forward movement of the arm latch member 72 with respect to the header latch member 70 and so maintains the lifter 10 secured to the header 2.

In the embodiment of FIG. 10 the latch lock 66 comprises a spring catch maintained in a closed position by a bias force and configured to be pushed open as the arm latch member 72 is moved rearward into engagement with the header latch member 70. The spring catch is configured to close when the latch members 72, 70 are fully engaged to prevent forward movement of the arm 50. The spring catch comprises a spring element 84 attached to the arm 50 and defining a recessed portion, provided by an aperture 86, at the arm latch member 72. The spring element 84 is biased toward the arm latch member 72, and has a lip 88 extending rearward and outward from a rear end thereof. The spring element 84 is configured such that the spring element 84 is pushed outward by contact with the header latch member 70 as the arm latch member 72 is moved rearward into engagement with the header latch member 70, and moves inward when the latch members are fully engaged and the aperture 86 aligns with the top of the header latch member 70. The spring element 84 thus maintains the header latch member 70 in the aperture 86 and prevents forward movement of the arm 50.

As illustrated in FIG. 11, the header latch member 70 is attached to the header at a proximate end thereof 70A thereof. As seen in FIG. 10, the vertical location of the header latch member 70 is adjusted by providing shims 73 between the header 2 and the header latch member 70 as required so that the bottom of the groove 74 is aligned with the top of the guard finger 8 such that the arm 50 can move rearward with the legs 76 in the groove 74 on each side of the shaft 71 of the header latch member 70. The guard bolt 60 extends through the shims 73 and into a threaded aperture through the header latch member 70 which acts as a nut for securing the bolt 60, and is tightened with a wrench on a hexagonal portion 77 thereof.

The illustrated header latch member 70 comprises a sloped outer wall 75 sloping outward and rearward from a distal end 70B opposite the proximate end 70A. The illustrated header latch member 70 has conical walls so that no alignment is required, and the rear wall will always slope outward.

The edge of the aperture 86 in the spring element 84 engages the outer wall 75, and the spring element 84 exerts a force toward the proximate end 70A of the header latch member 70 such that during vibration between the spring element 84 and the header latch member 70, such as will normally be encountered in operation, the edge of the aperture 86 in the spring element moves rearward down the sloped outer wall 75, thereby tightening the arm latch member 72 to the header latch member 70.

Figure 13:
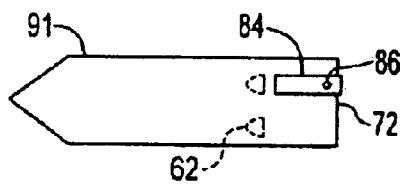
FIG. 13 is a schematic top view of a sunflower pan incorporating a releasable latch mechanism of the invention for attachment to a header.
Figure 14:
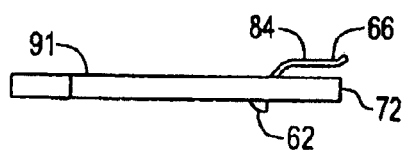
FIG. 14 is a side view of the sunflower pan of FIG. 13.

The illustrated latch mechanism can be used to similarly attach other crop accessories to a header. FIGS. 13 and 14 illustrate, for example, a sunflower pan 91 with an accessory latch member corresponding to the arm latch member 72 of FIG. 10, provided for example by a slot in the rear end of the sunflower pan 91, and also a spring element 84 and aperture 86. The header latch member is mounted in the same fashion on the header, and the sunflower pan 91 is moved rearward such that guard fingers on the header enter guard finger apertures in aperture members 62 on the bottom of the sunflower pan 91 and the aperture 86 falls over the header latch member. It is contemplated that any number of like crop accessories could be attached with such a mechanism.

Figure 15:
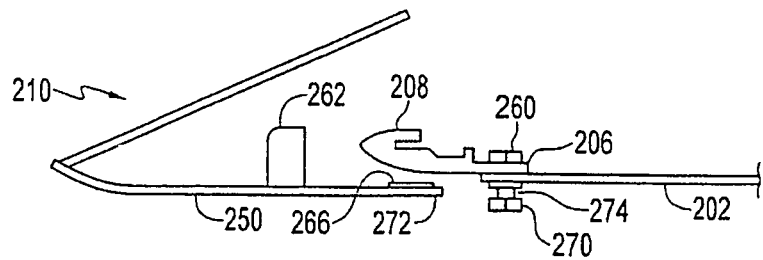
FIGS. 15 and 16 are side views of a further alternate embodiment of the crop lifter illustrating the latching engagement of the arm to the header.
Figure 16:
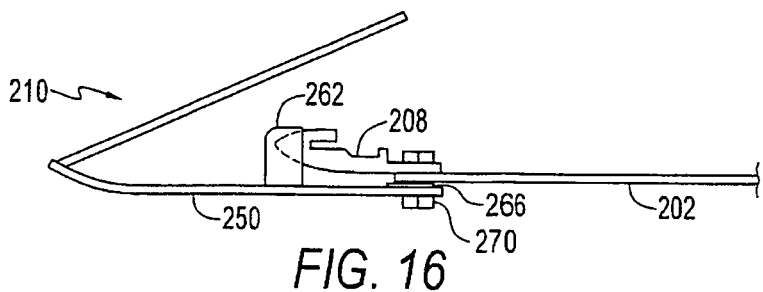

FIGS. 15 and 16 also illustrate an alternate crop lifter 210 that can be quickly installed and removed from a header 202 by sliding the lifter arm 250 rearward such that a guard finger 208 of a guard 206 attached to the header 202 engages a guard finger aperture in an aperture member 262 defined by the lifter 210 and the rear end of the lifter 210 moves into latching engagement with the header 202. The rear end of the lifter 210 is then locked to the header 202 to prevent forward movement of the lifter 210. Releasing the latch lock 266 at the rear end of the lifter 210 allows the lifter 210 to be moved forward and removed from the header 202.

The crop lifter 210 comprises a header latch member 270 adapted for attachment to a guard bolt 260 on an underside of the header 202, as opposed to the mounting on top of the header as in the embodiment of FIG. 10. An arm 250 is adapted to ride along the ground. An arm latch member 272 is located at a rear end of the arm 250 and is adapted to move rearward into engagement with the header latch member 270 such that the rear end of the arm 250 is maintained in substantially fixed vertical relationship to the header 202.

Figure 17:
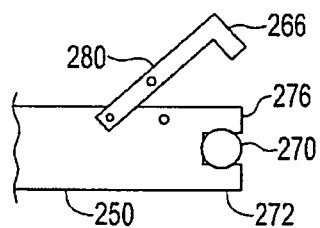
FIG. 17 is a schematic top view of a latch lock that could be used with the embodiment of FIG. 9 or 10 shown in the open position with the header and arm latch members fully engaged.

In the illustrated embodiment of FIGS. 15-22 the header latch member 270 defines an annular groove 274 such that there is a groove on each side thereof, and the arm latch member 272 comprises two legs, as illustrated in FIG. 17, configured to engage the annular groove 274 on each side thereof. Providing an annular groove allows the header latch member 270 to be oriented in any direction and still have grooves on each side thereof to engage the legs 276. Thus with the legs 276 engaged in the annular groove 274, the rear end of the arm 250 is vertically and laterally fixed with respect to the header 202.

Figure 24:
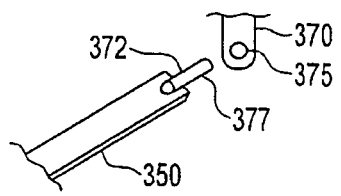
FIG. 24 is a perspective view of an alternate embodiment of the header and arm latch members.

FIG. 24 illustrates an alternate embodiment wherein the header latch member 370 defines a forward facing aperture 375 and wherein the arm latch member 372 comprises a dowel 377 configured to slide into the aperture 375.

As the arm 250 is moved rearward to engage the header and arm latch members 270, 272 the guard finger 208 enters the guard finger aperture defined by the aperture member 262 on the arm 250 forward of the arm latch member 272. Thus when the latch members 270, 272 are fully engaged, the guard finger 208 is fully engaged in the aperture member 262 and the lifter 210 is thus secured to the header 202. The releasable latch lock 266 is operative to prevent forward movement of the arm latch member 272 with respect to the header latch member 272 and so maintains the lifter 210 secured to the header.

Figure 18:
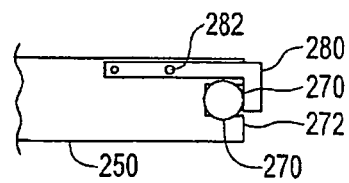
FIG. 18 is a schematic top view of the latch lock of FIG. 17 shown in the closed position with the header and arm latch members fully engaged.

Alternate embodiments of the latch lock 266 are illustrated in FIGS. 17-22. In the embodiment of FIGS. 17 and 18 the latch lock 266 comprises a lock plate 280 pivotally attached to a top of the arm 250 forward of the arm latch member 272 and movable from the closed position of FIG. 18 where the lock plate 280 is rearward of the header latch member 270, to the open position of FIG. 17 where the lock plate 280 is on one side of the header latch member 270. The lock plate 280 is maintained in the closed position by a detent 282 between the arm 250 and the lock plate 280 comprising a bump and corresponding recess.

In the embodiment of FIGS. 19-22 the latch lock 266, 466 comprises a spring catch maintained in a closed position by a bias force and configured to be pushed open as the arm latch member 272, 472 is moved rearward into engagement with the header latch member 270, 470. The spring catch is configured to close when the latch members 270, 470 and 272, 472 are fully engaged to prevent forward movement of the arm 250, 450.

Figure 19:
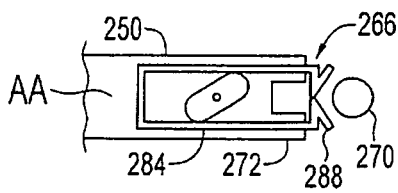
FIG. 19 is a schematic top view of a latch lock that could be used with the embodiment of FIG. 9 or 10 comprising a spring catch shown in the closed position adjacent to the header latching member.
Figure 20:
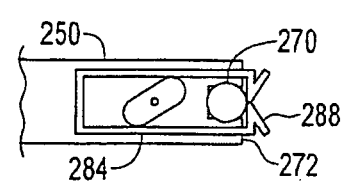
FIG. 20 is a schematic top view of the latch lock of FIG. 19 shown in the closed position with the header and arm latch members fully engaged.
Figure 21:
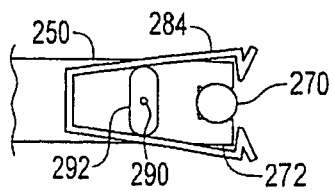
FIG. 21 is a schematic top view of the latch lock of FIG. 19 shown with the spring elements forced to an open position.

In the embodiment of FIGS. 19-21 the spring catch comprises a pair of spring elements 284 mounted to the arm 250 above a rear portion of the arm 250, one spring element 284 located on each side of an axis AA of the arm 250. The spring elements 284 are configured to resist movement away from the axis AA. A lip 288 at a rear end of each spring element 284 behind the arm latch member 272 extends rearward and away from the axis AA. The spring elements 284 are configured such that they are pushed away from the axis AA by the header latch member 270 contacting the lips 288 as the arm latch member 272 is moved rearward into engagement with the header latch member 270. The spring elements 284 then move toward the axis AA rearward of the header latch member 270 when the latch members 270, 272 are fully engaged, thereby preventing forward movement of the arm 250.

The embodiment of FIGS. 19-21 further comprises a pin 290 extending upward through a pin aperture in the rear portion of the arm 250. The pin 290 has a head on a bottom end thereof below the arm 250 (not illustrated), and a release member 292 attached to the pin 290 above the arm 250 between the spring elements 284. The release member 292 is oblong shaped such that rotation of the pin 290 causes the release member 292 to bear against the spring elements 284 to force the spring elements 284 apart, as illustrated in FIG. 21, and allow the arm 250 to be moved forward to move the arm latch member 272 out of engagement with the header latch member 270 and thereby release the arm 250. The release member 292 thus allows the operator to readily remove the arm 250 by rotating the head of the pin 290 with a wrench or the like on the easily accessible bottom of the arm 250. When used in the embodiment of FIG. 10 where the latching mechanism is on the top of the header, the mechanism is also easily accessible. Alternatively, the lips 288 could be omitted, and the release member 292 could be operated to force the spring elements 284 apart to allow the arm latch member 272 to move into engagement with the header latch member 270, then operated to allow the spring elements to move together to maintain engagement.

Figure 22:
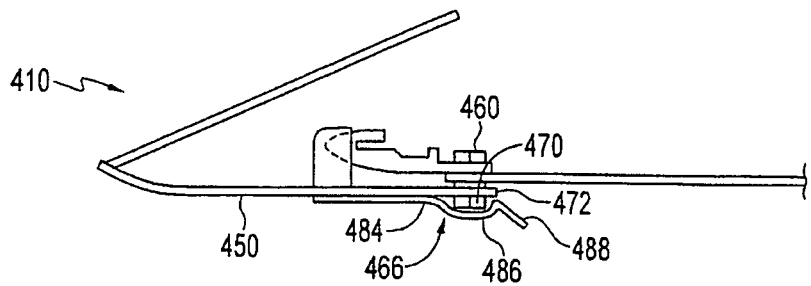
FIG. 22 is a schematic side view of an alternate latch lock for use with the embodiment of FIG. 9 or 10 comprising an alternate spring catch shown in the closed position with the header and arm latch members fully engaged.

In the alternate embodiment of a crop lifter 410 of the invention shown in FIG. 22, the latch lock 466 comprises a spring element 484 attached to a bottom rear portion of the arm 450 such that the spring element 484 resists downward movement. The spring element 484 defines a recessed portion 486 under the arm latch member 472, and has a lip 488 extending rearward and downward from a rear end thereof. The spring element 484 is configured as illustrated such that the spring element 484 is pushed downward by the header latch member 470 as the arm latch member 472 is moved rearward into engagement with the header latch member 470, and then moves upward when the latch members 470, 472 are fully engaged to maintain a bottom portion of the guard bolt 460 in the recessed portion 486 and prevent forward movement of the arm 450.

Figure 23:
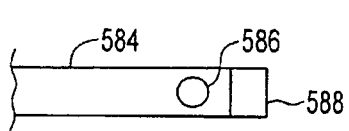
FIG. 23 is a bottom view of the rear end of an alternate spring element for use with the embodiment of FIG. 22 where the recessed portion is provided by an aperture through the spring element.

A bottom view of an alternate spring element 584 is illustrated in FIG. 23 for use in the place of the spring element 484 of FIG. 22. In place of the recessed portion 486, the spring element 584 provides an aperture 586 through the spring element 584, as in the spring element 84 of FIGS. 10 and 13. Thus the bottom portion of the guard bolt extends into or through the aperture 586, and is maintained in position. A lip 588 extends rearward and downward from the rear end of the spring element 584. If it was desired to omit the lip 588, a tool could be provided to pry the spring element 584 away from the arm to allow the latch members to engage, and then released to hold them together.

It is contemplated that a magnetic attachment could be used to lock an accessory to the header as well.

Figure 25:
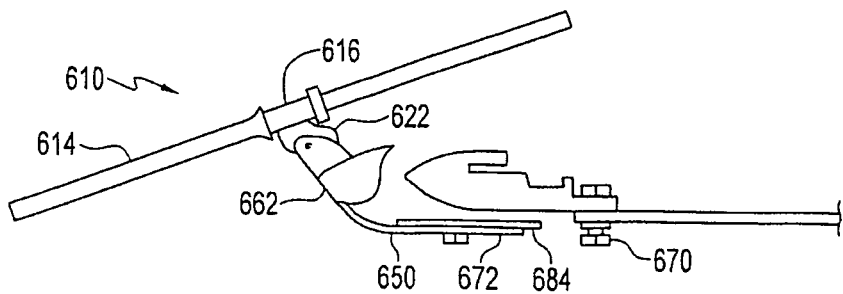
FIG. 25 is a side view of an alternate crop lifter wherein the guard finger aperture is located at the front end of the arm, and the rear end of the arm latches to the header.

FIG. 25 illustrates an alternate crop lifter 610, very similar to the embodiment of FIG. 10 except that here the header latch member 670 is mounted on the bottom of the header, and an alternate latch lock is used. The aperture member 662 is located at the upturned front end of the arm 650, and the arm latch member 672 at the rear end of the arm 650 latches to the header latch member 670 as described above. The crop lifter 610 is illustrated using a spring catch of FIGS. 19-21, with spring elements 684 on top of the arm 650, however alternate latch locks could be used as well. The crop lifter 610 uses a mounting bracket 622 similar to that of FIGS. 2, 8 and 10 pivotally mounted to the front end of the arm 650 on aperture member 662 and incorporating a quick-attach mechanism 616 such as that illustrated in FIGS. 5-7 to attach the lifting finger 614.

Compared to the prior art mechanisms for quick attachment of a lifter that hook into the annular groove and are latched to the guard finger, the lifter of the present invention latches to the header, and only a conventional stationary aperture member is required to engage the guard finger, such that moving parts are removed from the cutting area of the header.

By positioning the header latch member and accessory latch member above the header as illustrated in FIG. 10 instead of below the header, the latch mechanism is not exposed to the soil passing under the header which can wear the mechanism. The mechanism on top of the header does not appear to interfere with crop flow over the cutting edge of the header.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

I claim:

1. A crop lifter adapted for attachment to a cutting header having a knife and cooperating guards mounted along a lower front edge thereof, the crop lifter comprising:
   a mounting bracket adapted for pivotal attachment to a guard finger of the header;
   a lifting finger attached to the mounting bracket such that a leading end of the lifting finger is ahead of and below the knife and such that pivoting the mounting bracket up and down with respect to the guard finger varies a distance between the leading end of the lifting finger and ground level;
   a pivot lock mechanism operative, during field operations, to fix the mounting bracket at a selected one of a plurality of pivotal positions with respect to the guard finger to prevent upward and downward movement of the leading end of the lifting finger in response to forces exerted on the lifting finger during field operations.

2. The crop lifter of claim 1 wherein the guard finger defines a finger hole extending laterally therethrough, and wherein the mounting bracket is attachable to the guard finger by a bolt through the finger hole and through corresponding holes in the mounting bracket.

3. The crop lifter of claim 2 wherein the pivot lock mechanism is provided by a nut tightened on to the bolt to clamp the mounting bracket to the guard finger.

4. The crop lifter of claim 2 wherein the pivot lock mechanism is provided by a pin placed through a hole in the mounting bracket and a selected one of a plurality of stop holes in the guard finger.

5. The crop lifter of claim 1 comprising an aperture member adapted for attachment to the guard finger, and wherein the mounting bracket is pivotally attached to the aperture member.

6. The crop lifter of claim 5 wherein the aperture member defines a hole extending laterally therethrough, and wherein the mounting bracket is attachable to the guard finger by a bolt through the hole and through corresponding holes in the mounting bracket.

7. The crop lifter of claim 5 wherein the pivot lock mechanism is provided by a nut tightened on to the bolt to clamp the mounting bracket to the guard finger.

8. The crop lifter of claim 5 wherein the pivot lock mechanism is provided by a stop pin placed through a hole in one of the mounting bracket and the aperture member, and a selected one of a plurality of stop holes in the other of the mounting bracket and the aperture member.

9. The crop lifter of claim 1 wherein the lifting finger includes a carrying portion extending rearward from the leading end of the lifting finger to guide lifted crop to the knife for cutting.

10. The crop lifter of claim 1 wherein the lifting finger is structurally weak compared to the lifting member such that the lifting finger will readily move when striking an obstruction, thereby preventing damage to the lifter member.

* * * * *